United States Patent
Hillen

(10) Patent No.: US 10,801,381 B2
(45) Date of Patent: Oct. 13, 2020

(54) EXHAUST GAS AFTER TREATMENT DEVICE

(71) Applicant: INNIO Jenbacher GmbH & Co OG, Jenbach (AT)

(72) Inventor: Friedhelm Hillen, Jenbach (AT)

(73) Assignee: INNIO Jenbacher GmbH & Co OG, Jenbach (AT)

(*) Notice: Subject to any disclaimer, the term of this patent is extended or adjusted under 35 U.S.C. 154(b) by 39 days.

(21) Appl. No.: 15/254,403

(22) Filed: Sep. 1, 2016

(65) Prior Publication Data

US 2017/0067382 A1 Mar. 9, 2017

(30) Foreign Application Priority Data

Sep. 4, 2015 (AT) .............................. A 50759/2015

(51) Int. Cl.
*F01N 3/20* (2006.01)
*F01N 3/10* (2006.01)
(Continued)

(52) U.S. Cl.
CPC ............... *F01N 3/103* (2013.01); *F01N 3/10* (2013.01); *F01N 3/2066* (2013.01); *F01N 3/2892* (2013.01); *F01N 9/00* (2013.01); *F01N 13/0093* (2014.06); *F01N 2240/12* (2013.01); *F01N 2610/02* (2013.01); *F01N 2610/03* (2013.01);
(Continued)

(58) Field of Classification Search
CPC .... F01N 13/0093; F01N 13/0097; F01N 3/10; F01N 3/18; F01N 3/26; F01N 2240/10; F01N 2240/12; F01N 2240/16; F02D 41/0245; F02G 5/02
See application file for complete search history.

(56) References Cited

U.S. PATENT DOCUMENTS 2,946,651 A * 7/1960 Houdry ................ B01D 53/944
126/91 A
3,172,251 A 3/1965 Johnson
(Continued)

FOREIGN PATENT DOCUMENTS

CN 1119128 A 3/1996
CN 2537823 Y 2/2003
(Continued)

OTHER PUBLICATIONS

Unofficial English translation of Office Action issued in connection with related AT Application No. A377/2014 dated May 13, 2015.
(Continued)

*Primary Examiner* — Matthew T Largi
(74) *Attorney, Agent, or Firm* — Fletcher Yoder, P.C.

(57) ABSTRACT

Embodiments relate to an exhaust gas after-treatment device with an exhaust line having an inlet for discharging the exhaust gas and a thermal reactor, which is arranged in the exhaust line and has a first, thermal reaction zone for the exhaust gas flow, where a mixing device is provided for admixing a reducing agent to the exhaust gas flow in the exhaust line, which is arranged between the inlet and the thermal reactor and where the thermal reactor has at least one second reaction zone for a catalytic reaction in the exhaust gas flow with the involvement of the reducing agent.

18 Claims, 1 Drawing Sheet

(51) Int. Cl.
*F01N 9/00* (2006.01)
*F01N 3/28* (2006.01)
*F01N 13/00* (2010.01)

(52) U.S. Cl.
CPC ....... *F01N 2900/1602* (2013.01); *Y02T 10/24* (2013.01); *Y02T 10/47* (2013.01)

(56) References Cited

U.S. PATENT DOCUMENTS

| | | | |
|---|---|---|---|
| 3,211,534 | A | 10/1965 | Ridgway |
| 3,276,202 | A | 10/1966 | Gary |
| 3,297,400 | A | 1/1967 | Eastwood |
| 3,799,134 | A | 3/1974 | Griese |
| 3,826,089 | A | 7/1974 | Nakajima et al. |
| 3,854,288 | A | 12/1974 | Heitland et al. |
| 3,927,523 | A * | 12/1975 | Shioyama ............ F01N 3/18 123/406.55 |
| 3,972,685 | A | 8/1976 | Hanaoka |
| 4,009,574 | A | 3/1977 | Melchior |
| 4,233,811 | A * | 11/1980 | Masaki ............... F01N 3/18 60/274 |
| 4,233,812 | A | 11/1980 | Leistritz |
| 4,848,082 | A * | 7/1989 | Takahashi ........... F01N 3/2006 440/89 G |
| 5,031,401 | A | 7/1991 | Hinderks |
| 5,195,316 | A | 3/1993 | Shinzawa et al. |
| 5,243,818 | A * | 9/1993 | Schatz ............... F01N 3/18 422/173 |
| 5,325,666 | A | 7/1994 | Rutschmann |
| 5,437,152 | A | 8/1995 | Pfefferle |
| 5,571,491 | A * | 11/1996 | Thunstrom ......... B01D 53/864 422/171 |
| 5,582,004 | A | 12/1996 | Rutschmann |
| 5,589,142 | A * | 12/1996 | Gribbon ............ B01D 53/8656 110/211 |
| 5,593,645 | A | 1/1997 | Steenackers et al. |
| 6,261,093 | B1 * | 7/2001 | Matros ................ F23G 5/50 432/180 |
| 6,370,872 | B1 | 4/2002 | Watanabe et al. |
| 6,530,215 | B2 | 3/2003 | Alkemade et al. |
| 6,955,042 | B1 | 10/2005 | Wnuck et al. |
| 7,065,958 | B2 * | 6/2006 | Funk ................. B01D 53/9431 60/274 |
| 7,334,400 | B2 | 2/2008 | Yan et al. |
| 7,386,977 | B2 | 6/2008 | Ancimer et al. |
| 7,571,602 | B2 | 8/2009 | Koch |
| 8,246,922 | B2 | 8/2012 | Boorse et al. |
| 8,268,273 | B2 | 9/2012 | Doering |
| 8,475,754 | B2 | 7/2013 | Eigenberger et al. |
| 8,534,051 | B2 | 9/2013 | Tsujimoto et al. |
| 8,627,654 | B2 | 1/2014 | Roos et al. |
| 8,631,647 | B2 | 1/2014 | Neels et al. |
| 8,689,547 | B2 | 4/2014 | Burgers et al. |
| 9,016,051 | B2 | 4/2015 | Iwasaki |
| 9,115,625 | B2 | 8/2015 | Igarashi |
| 2005/0000215 | A1 | 1/2005 | Baeuerle |
| 2006/0053771 | A1 | 3/2006 | Murata |
| 2006/0123784 | A1 | 6/2006 | Algrain |
| 2006/0153761 | A1 * | 7/2006 | Bandl-Konrad ... B01D 53/9431 423/239.1 |
| 2009/0130011 | A1 * | 5/2009 | Abrams ............ B01D 53/8625 423/239.1 |
| 2010/0154411 | A1 | 6/2010 | Brueck et al. |
| 2011/0022289 | A1 | 1/2011 | Hofbauer |
| 2012/0117962 | A1 | 5/2012 | Vandyne et al. |
| 2012/0216529 | A1 | 8/2012 | Joshi et al. |
| 2013/0276438 | A1 | 10/2013 | De Rudder et al. |
| 2014/0007562 | A1 | 1/2014 | Justin |
| 2014/0007851 | A1 | 1/2014 | Vassallo et al. |
| 2015/0176454 | A1 | 6/2015 | Dreves et al. |
| 2015/0337758 | A1 * | 11/2015 | Fuchs ................ F02G 5/02 60/645 |

FOREIGN PATENT DOCUMENTS

| | | |
|---|---|---|
| CN | 102562233 A | 7/2012 |
| CN | 103527331 Y | 1/2014 |
| DE | 3045666 A1 | 7/1982 |
| DE | 69220092 T2 | 12/1997 |
| DE | 10139526 A1 | 2/2003 |
| DE | 10327686 A1 | 1/2005 |
| DE | 102006037649 A1 | 2/2008 |
| DE | 102010011026 A1 | 9/2011 |
| DE | 102011086778 A1 | 5/2013 |
| EP | 0161470 A1 | 11/1985 |
| EP | 0468919 A1 | 1/1992 |
| EP | 0668471 A2 | 8/1995 |
| EP | 2006178 A1 | 12/2008 |
| EP | 2527611 A1 | 11/2012 |
| EP | 2535539 A1 | 12/2012 |
| EP | 2578866 A1 | 4/2013 |
| EP | 2671630 A1 | 12/2013 |
| EP | 2853704 A1 | 4/2015 |
| JP | H0267021 U | 5/1990 |
| JP | H0754640 A | 2/1995 |
| JP | H07224641 A | 8/1995 |
| JP | H0913958 A | 1/1997 |
| JP | 2004197569 A | 7/2004 |
| JP | 2004211660 A | 7/2004 |
| JP | 2005061366 A | 3/2005 |
| JP | 2008038736 A | 2/2008 |
| JP | 2010242522 A | 10/2010 |
| WO | 9113242 A1 | 9/1991 |
| WO | 9947245 A1 | 9/1999 |
| WO | WO 9947245 A1 * | 9/1999 ............ B01D 53/56 |
| WO | 2004113694 A1 | 12/2004 |
| WO | 2005093235 A1 | 10/2005 |
| WO | 2011023848 A1 | 3/2011 |
| WO | 2012123636 A1 | 9/2012 |
| WO | 20120123636 A1 | 9/2012 |
| WO | 2013112101 A1 | 8/2013 |
| WO | 2013137105 A1 | 9/2013 |
| WO | 2014050179 A1 | 4/2014 |

OTHER PUBLICATIONS

Unofficial English translation of Office Action issued in connection with related AT Application No. A376/2014 dated May 21, 2015.
Unofficial English translation of Office Action issued in connection with related AT Application No. A572/2014 dated Jul. 10, 2015.
European Search Report and Opinion issued in connection with related EP Application No. 15167318.3 dated Oct. 9, 2015.
European Search Report issued in connection with related EP Application No. 15167529.5 dated Oct. 15, 2015.
European Search Report issued in connection with related EP Application No. 15001908 dated Dec. 3, 2015.
CA Office Action issued in connection with related CA Application No. 2892098 dated Mar. 17, 2016.
CA Office Action issued in connection with related CA Application No. 2892397 dated Mar. 17, 2016.
U.S. Office Action issued in connection with related U.S. Appl. No. 14/715,970 dated Mar. 28, 2016.
U.S. Office Action issued in connection with related U.S. Appl. No. 14/714,623 dated Apr. 8, 2016.
U.S. Office Action issued in connection with related U.S. Appl. No. 14/788,986 dated Jul. 5, 2016.
Unofficial English translation of Office Action issued in connection with related AT Application No. A50758/2015 dated Jul. 8, 2016.
Unofficial English translation of Office Action issued in connection with related AT Application No. A50756/2015 dated Jul. 18, 2016.
Unofficial English translation of Search Report issued in connection with related JP Application No. 2015130611 dated Jul. 20, 2016.
Unofficial English translation of Office Action issued in connection with related JP Application No. 2015130611 dated Jul. 26, 2016.
Unofficial English translation of Office Action issued in connection with corresponding AT Application No. A50759/2015 dated Jul. 27, 2016.

(56) References Cited

OTHER PUBLICATIONS

Unofficial English translation of Office Action issued in connection with related AT Application No. A377/2014 dated Aug. 4, 2016.
Unofficial English translation of Office Action issued in connection with related KR Application No. 20150102685 dated Aug. 19, 2016.
Unofficial English translation of Office Action issued in connection with related EP Application No. 15167318.3 dated Sep. 9, 2016.
U.S. Office Action issued in connection with related U.S. Appl. No. 14/715,970 dated Oct. 6, 2016.
GE Power and Water, "CL.AIR Exhaust Treatment System", 2013 retrieved from http://site.ge-energy.com/prod_serv/products/recip_engines/du/emission_red_sys/clair.htm on Oct. 18, 2016.
U.S. Office Action issued in connection with related U.S. Appl. No. 14/714,623 dated Oct. 21, 2016.
International Search Report and Written Opinion issued in connection with Related PCT Application No. PCT/EP2016/070635 dated Nov. 25, 2016.
International Search Report and Written Opinion issued in connection with Related PCT Application No. PCT/EP2016/070841 dated Dec. 13, 2016.
GB Search Report issued in connection with corresponding GB Application No. 1615026.0 dated Jan. 25, 2017.
U.S. Final Office Action issued in connection with related U.S. Appl. No. 14/788,986 dated Feb. 16, 2017.
U.S. Office Action issued in connection with related U.S. Appl. No. 14/715,970 dated Mar. 27, 2017.
Unofficial English Translation of Chinese Office Action issued in connection with related CN Application No. 201510478367.9 dated Feb. 20, 2017.
Unofficial English Translation of Chinese Office Action issued in connection with related CN Application No. 201510430081.3 dated Apr. 20, 2017.
Jochen Fuchs et al., May 19, 2015, U.S. Appl. No. 14/715,970.
Friedhelm Hillen, May 18, 2015, U.S. Appl. No. 14/714,623.
Friedhelm Hillen et al., Jul. 1, 2015, U.S. Appl. No. 14/788,986.
2015 Clarke Energy website explanation of CL.AIR® System, mentioned in the specification.
Unofficial English Translation of Austria Office Action issued in connection with Related AT Application No. 1AA295/2015 dated Apr. 11, 2016.
U.S. Appl. No. 15/750,424, filed Feb. 5, 2018.

\* cited by examiner

EXHAUST GAS AFTER TREATMENT DEVICE

BACKGROUND

Embodiments of the present invention relate to an exhaust gas after-treatment device.

A generic exhaust gas after-treatment device has been described in Austrian Patent application number A 377/2014, of which the applicant is the same. The device concerns the implementation of the so-called regenerative thermal oxidation (RTO), in which unburned hydrocarbons and other oxidizable exhaust components are thermally oxidized.

In the regenerative thermal oxidation, the exhaust gas is initially led through a heat accumulator, usually consisting of ceramic bulk material or honeycomb structure, in order to finally enter the reaction chamber. In the reaction chamber, the exhaust can be further heated by additional heating facilities until a thermal oxidation of the undesirable exhaust gas components can take place.

Then, the exhaust gas flows through another heat accumulator, and is discharged into the environment. During operation, the flow direction is alternatingly changed, allowing the exhaust gas to be preheated before reaching the reaction chamber, so that energy can be saved while heating the exhaust gas further.

The additional heating can be provided by gas injection or burner (so-called support gas) or an additional electrical heating.

Usually the reaction chamber has a free flow cross-section, because if the dwell time of the exhaust gas is increased in the reaction chamber, the oxidation can take place in the form of a gas phase reaction. Carbon monoxide (CO) and methane ($CH_4$) are particularly relevant in the species to be oxidized in the exhaust gas.

The thermal reactor from A 377/2014 is constructed as a regenerative heat exchanger and consists of two storage volumes, a reaction chamber as well as a change over mechanism. The exhaust gas flows at a temperature of about 400 to 530° C. from the motor through a change over mechanism into a first storage volume, where it is heated to about 700-850° C. In the reaction chamber, the exhaust gas reacts with the available oxygen, where carbon monoxide and unburned hydrocarbons are oxidized to carbon dioxide and water. When passing through the second storage volume, the exhaust gas again releases heat and attains the changeover mechanism at a temperature of 430 to 560° C., which leads it to the chimney or a downstream exhaust heat recovery.

The regenerative thermal oxidation offers a robust method, through which after-treatment of even large exhaust mass flows can be economically carried out.

In the above-mentioned application, it has also been described that the thermal reactor can also be a reaction zone in the thermal reactor for the catalytic oxidation in order to support the action of the thermal reactor.

Further, the so-called selective catalytic reduction (SCR) is also known, which is well suitable for the reduction of unwanted nitrogen oxides in the exhaust gas. In the case of SCR, the exhaust gas flow is initially admixed with a reduction agent, which is usually an aqueous urea solution. The urea dissociates to ammonia in the hot exhaust gas flow. In a catalytic reaction zone suitable for the SCR, the ammonia reacts together with the nitrogen oxides present in the exhaust gas flow over several reaction paths to form molecular nitrogen and water. Optimal temperatures of the exhaust gas flow for the selective catalytic reduction lie in the range between 350° C. and 500° C.

It is to be noted that the quantity of urea solution to be admixed is relatively precisely controlled and should be regulated in order to prevent the release of unreacted ammonia. However, a sufficiently long mixing stretch is necessary for the urea to have a real possibility of dissociation before the corresponding catalytic reaction zone is reached.

Since the regenerative thermal oxidation and selective catalytic reduction have very different requirements for the temperature of the exhaust gas flow, a single exhaust gas after-treatment device for both uses is difficult.

The task of the present application is to use both the regenerative thermal oxidation as well as the selective catalytic reduction in a single exhaust gas after-treatment device.

BRIEF DESCRIPTION

A solution for this task is achieved by an exhaust gas after-treatment device and by means of a mixing device for admixing a reducing agent to the exhaust gas flow in the exhaust line, which is arranged between the inlet of the exhaust gas after-treatment device and the thermal reactor, where the thermal reactor has at least one second reaction zone in the exhaust gas flow for a catalytic reaction with the involvement of the reducing agent.

The counterintuitive idea to bring the two reaction zones closer together may be beneficial because there are more possibilities in the thermal reactor to vary the temperature of the exhaust gas flow.

A potential benefit of the device may be that the at least one second reaction zone can also act as a heat accumulator.

The device is not limited for use in stationary combustion engines, but may also be used in marine applications. For example, the device can be used for gas engines (which can drive a generator, the so-called genset) or the so-called dual-fuel engines. It can also be used for combustion engines with 8, 10, 12, 14, 16, 18, 20, 22, 24 or more cylinders.

In an embodiment, the first reaction zone and the at least one second reaction zone can be arranged in an enclosure.

In an embodiment, nitrogen oxides are reduced by the reaction in the second reaction zone in the exhaust gas flow.

In an embodiment, the reducing agent can contain urea and/or ammonia and/or a hydrocarbon. Of course, combinations can also be used. The reducing agent can be admixed as an aqueous solution, i.e., for example, as aqueous urea solution. Alternatively or additionally, an aqueous ammonia solution, gaseous ammonia or a nitrogen-hydrocarbon combination can also be used as a reducing agent. The latter can also be used to obtain an additional power source, which can provide a part of the support gas for oxidation.

In another embodiment, at least one second reaction zone is designed as a surface structure with a coating.

The surface structure can be typically formed by a honeycomb structure, bulk material or such.

Typically, vanadium (for example $V_2O_5$), tungsten, titanium, other promoters, and, combinations thereof, can be used as materials for the (SCR) coating. Fe-zeolites or Cu-zeolites can also be used.

In an embodiment, the thermal reactor has two openings and the openings are used alternately as inlet opening or as outlet opening for the exhaust gas flow depending on the switching status of a switching valve. The possibility to change the direction of flow through the thermal reactor is a powerful means that can be exploited for temperature management.

In an embodiment, there may be two second reaction zones, where one of the first reaction zone is arranged upstream and one of the first reaction zone is arranged downstream. It can be provided that the thermal reactor is arranged in an enclosure that has a reaction chamber as first reaction zone and the at least one second reaction zone.

A heat accumulator can be appropriately arranged between the first reaction zone and the two second reaction zones. This can be used to store and re-use the heat produced in the first thermal reaction zone. In the present embodiments, this may be beneficial, since the exhaust gas flow emerging from the second reaction zone can also be heated by means of the heat accumulator. This can enable to simultaneously carry out the selective catalytic reduction at a relatively low temperature and the thermal oxidation at a relatively high temperature.

At least one bypass line can be provided, by means of which at least one of the at least one second reaction zone can be bypassed by the exhaust gas flow, wherein a shutoff valve is provided to shut off the bypass line.

The possibility to bypass the at least one second reaction zone may offer a benfit in terms of control or regulation, since it is possible that too high of temperatures cannot be avoided for the selective catalytic reduction. The bypass will prevent any damage of the at least one second reaction zone.

At least one third catalytic reaction zone can also be provided for a catalytic oxidation, in which case, two third reaction zones are provided, of which one first reaction zone is arranged upstream and one downstream.

By the action of a third catalytic reaction zone, the regenerative thermal oxidation can be supported and carbon monoxide can be typically oxidized faster. By providing two separate third catalytic reaction zones, preferably a single bypass line may be adequate for the operation.

The third reaction zone can also be arranged within the first reaction zone. In this case, it may be beneficial if the bypass line is divided into two parts and in particular if at least two second reaction zones are provided. By dividing the bypass line into two parts, it can be ensured that at least one of the second reaction zones is bypassed, but the first thermal reaction zone is not bypassed, so that when using the bypass line the positive benefits of the inventive exhaust gas after-treatment device will be reduced, but will not be totally eliminated.

The third catalytic reaction zone can also be designed as a surface structure with a coating. The third reaction zone can be designed as an oxidation catalytic converter, which typically has porous surface layers (wash coats) of $Al_2O_3$, which, in turn, are coated with a precious metal (such as platinum, palladium or its mixture). Metals or ceramics may also be carriers. Oxidation catalytic converters from bulk material are also possible.

It may be beneficial to arrange the third reaction zone closer the first reaction zone as the second reaction zone and/or a possible heat accumulator.

In an embodiment, the first reaction zone is heatedby means of an electrical heating device.

Also a feeding device can be provided for the introduction of a fuel in the first reaction zone.

Both the ability to heat as well as to feed fuel may serve to ensure a sufficiently high temperature is available in the first thermal reaction zone.

A control and/or regulation unit can be provided, by means of which at least one of the following elements can be controlled and/or regulated: the mixing device the switching valve, the shutoff valve, the heating device. By means of an appropriate regulation, the temperature of the exhaust gas flow can be optimized in the individual reaction zones.

It may be beneficial if at least one temperature sensor is provided upstream and/or downstream of the first reaction zone. Through the feedback of the temperature with the control and/or regulation of the above-mentioned elements, the temperature control can be improved further.

Protection is also required for a combustion engine with an inventive exhaust gas after-treatment device.

BRIEF DESCRIPTION OF THE DRAWINGS

Further advantages and features of the invention are illustrated with the help of the figures as well as the descriptions corresponding to them. Please refer to the Figures.

DETAILED DESCRIPTION

Figure 1:
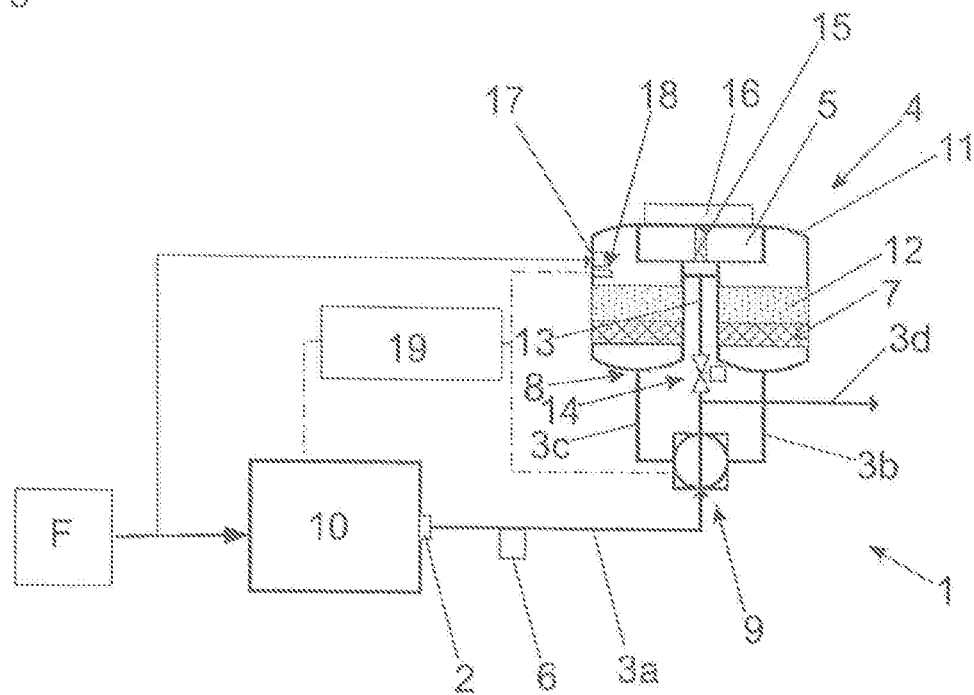
FIG. 1 is a schematic representation of a first embodiment of an inventive exhaust gas after-treatment device together with a combustion engine.
Figure 2:
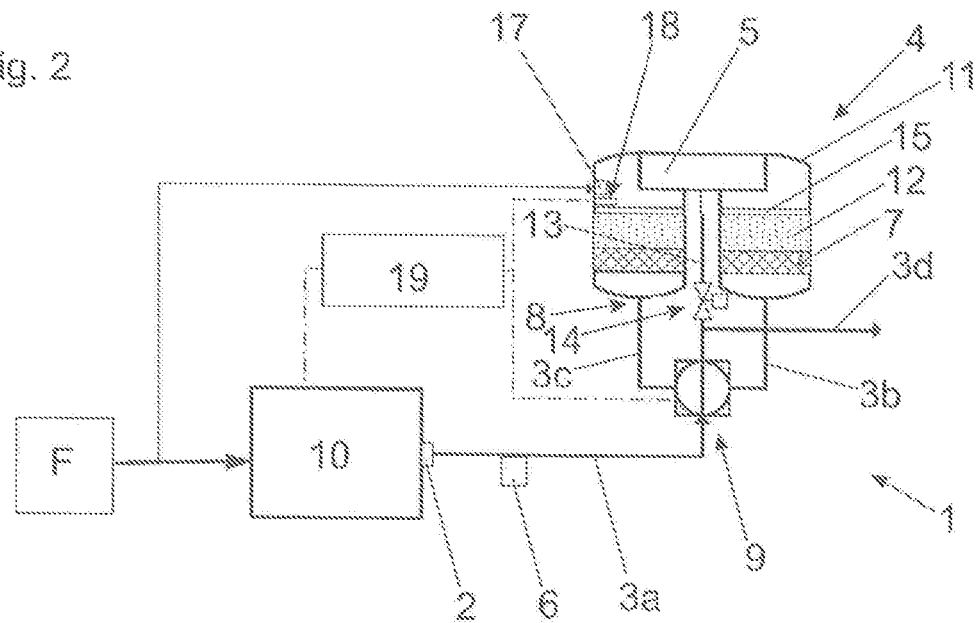
FIG. 2 is a schematic representation of a second embodiment of an inventive exhaust gas after-treatment device together with a combustion engine.

FIGS. 1 and 2 respectively present a combustion engine 10 purely schematically. The exhaust gas enters the exhaust line 3 through the inlet 2, where four different sections of the exhaust line 3 have been given the reference numbers 3a, 3b, 3c and 3d. The section 3a extends from the inlet 2 up to switching valve 9. The sections 3b and 3c each extend from the switching valve 9 to a separate opening 8 in the thermal reactor 4. (Only one of the openings 8 has been shown with a reference number for the overview.) The section 3d of the exhaust line 3 extends from the switching valve to a chimney or a similar provision (not shown), allowing the exhaust gas to flow into the opening.

The thermal reactor 4 is essentially divided symmetrically into two parts. This makes it possible to let the thermal reactor 4 get flow in two directions, in which essentially similar flow conditions prevail.

The switching valve 9 has at least two different switching positions. In a first switching position, the exhaust gas flow entering the switching valve 9 through from inlet 2 over the section 3a of exhaust line 3 is led into the thermal reactor through the branch 3b. The exhaust gas comes out of the thermal reactor and returns back to the switching valve 9 through the line 3c. The switching valve 9 allows the exhaust gas flow from 3c further to section 3d of the line through which the exhaust gas flows into the open. In the second switch position of the switching valve 9, the thermal reactor 4 flow is in the opposite direction. The flow in the exhaust line 3 will be in the sequence 3a, 3c, 3b, 3d.

The switching valve 9 may have one or more intermediate positions, and both the openings 8 of the thermal reactor 4 can be actuated proportionately. If an intermediate position is designed to approximately 50% of the total flow, then the exhaust gas flow can practically bypass the thermal reactor 4, which may be beneficial if the entire thermal reactor 4 or its parts are about to be overheated or have already been overheated, because during the exhaust gas flow, the thermal reactor 4 is bypassed and thus no heat/energy is supplied to it any longer, and the thermal reactor 4 can cool off.

The thermal reactor is arranged in an enclosure 11. The reaction chamber 5 arranged in the upper part of the thermal reactor 4 as shown in the figures forms the first thermal reaction zone.

It is to be noted that the thermal reactor 4 need not be oriented as shown in the figure. For example, it can also be horizontally oriented. Also, the schematically represented design of the enclosure 11 with two parts is not absolutely necessary. The thermal reactor 4 can be arranged, for example, in a nearly tube-shaped enclosure 11 with a partition or such.

Heat accumulators 12 are arranged symmetrically around the reaction chamber 5, which preheat the exhaust gas or store the heat arising in the reaction chamber 5, depending on the switching status of the switching valve 9. If, for example, the heat accumulator 12 on the right as shown in the figures is so much heated that the exhaust gas flow is not able to increase the temperature of the heat accumulator 12 further, then the switching state of the switching valve 9 can be changed. The heated heat accumulator 12 can then transfer heat to the exhaust gas flow, in order to preheat this for the reaction in the reaction chamber 5.

At the same time, the other heat accumulator 12, which had served to heat the fuel exhaust gas flow in the previous switching state, is recharged, i.e. heated.

In addition to the heating of the exhaust gas flow through the heat accumulator 12, feeding devices 17 are provided in both embodiments for the introduction of fuel into the reaction chamber 5. The fuel F required for this can be typically the same fuel F, which is used for the operation of the combustion engine. The type of the reservoir from which the fuel F is obtained is not important for the invention (example: Tank).

In the embodiment according to FIG. 1, an additional electrical heating device 16 is provided.

In addition, the thermal reactor 4 has two second reaction zones 7. For the catalytic reaction to be produced in the thermal reactor, a mixing device 6 is provided in the line section 3a of the exhaust line 3, through which a reduction agent is admixed to the exhaust gas. The reducing agent is an aqueous urea solution in these embodiments.

In this embodiment, the mixing device 6 is designed as the mixing tube with an injector. Mixing setups can also be provided, which produce swirls downstream of the injector for causing a thorough mixing. Such mixing facilities can include vanes and louvers.

Until the exhaust gas flow (with admixed reduction agent) enters the first of the two second reaction zones 7, the urea is dissociated to ammonia. In the second reaction zone through which the flow took place first, a catalytic reaction takes place, in which the nitrogen oxides in the exhaust gas flow react together with the ammonia to form molecular nitrogen and water.

Thereby, the quantity of admixed reducing agent should be so regulated or controlled so that no more ammonia will be present when leaving the second reaction zone 7 through which the flow took place first. Otherwise, nitrogen oxides are produced again in the thermal, first reaction zone 5. It is to be noted that the selective catalytic reduction takes place with the involvement of the reducing agent almost exclusively in the second reaction zone 7 through which the flow took place first, because, as mentioned above, no more ammonia is present when the exhaust gas flows through the other second reaction zone 7.

This procedure results in an optimal thermal situation both for the selective catalytic reduction as well as for the regenerative thermal oxidation. Immediately after throughflow in the second reaction zone 7, the exhaust gas flow is heated in one of the heat accumulators 12 so that the temperature of the exhaust gas flow has the higher temperature that is necessary for the regenerative thermal oxidation in the first reaction zone 5. As mentioned above, this can be achieved by means of a heating device 16 and the injection of fuel by means of the feeding device 17.

The second reaction zones 7 are characterized by a honeycomb structure construction with an appropriate coating for the described reaction.

Both embodiments show additionally at least one third reaction zone 15, which concerns catalytic oxidation zones. These are also characterized by a honeycomb structure or such with appropriate coating.

The heat accumulator 12 can be constructed, for example, out of a metallic honeycomb structure or ceramic bulk material.

In the embodiment according to FIG. 1, the third reaction zone 15 is arranged inside the reaction chamber 5. In order to bypass that second reaction zone 7, through which the exhaust gas flows first, a bypass line 13 is provided. This connects the chambers in the enclosure 11, which are arranged between the reaction chamber 5 and the heat accumulators 12, with the section 3d of the exhaust line 3 leading into the open. Also, a shutoff valve 14 is provided in the bypass line 13. If it is detected that the temperature in one of the second reaction zones 7 is too high, the switching valve 9 can be switched, such that the gas flows through overheated second reaction zone 7 secondly and the shutoff valve 14 can be opened. By this, the exhaust gas flow bypasses the overheated second reaction zone 7, causing it to cool down. It is to be noted that efficiency of a catalyst for the selective catalytic reduction may be adversely affected by overheating.

FIG. 2 shows an embodiment with an alternative arrangement of the third reaction zones 15 for the catalytic oxidation and a corresponding alternative arrangement of the bypass line 13.

In both embodiments, a control and/or regulation device is provided, which performs the described operation of the thermal reactor 4 and other elements. For that, the control and/or regulation device 19 is connected with temperature sensors 18, which measure the temperature of the exhaust gas flow at various points of the thermal reactor 4. It is to be noted that the figures show only one temperature sensor 18, so as not to affect the clarity of the figures. Identical temperature sensors 18 are provided at appropriate places of the other branch of the thermal reactor 4.

The same applies to the feeding device 17. Even though this is indicated only once for the sake of clarity, it should be present at least in pairs, so that fuel F can be injected in each direction of through-flow into the reaction chamber 5.

It should also be noted that various elements, which are present symmetrically in pairs in the thermal reactor 4, have been identified with a reference number only on one side of the thermal reactor 4. This is also the case for the sake of clarity in the figures.

The control and/or regulation unit 19 is connected, apart from with the temperature sensors 18, even with the combustion engine 10, the mixing device 6, the switching valve 9, the shutoff valve 14 and the feeding device 17, and controls and/or regulates these elements accordingly. Again, for the sake of clarity, not all the connections have been shown.

It is to be noted that the so-called ammonia slip in the embodiments presented is compensated in a natural way, since the provided catalytic oxidation zones 15 reduce excess ammonia.

The invention is not limited to the embodiments presented here. For example, second reaction zones can be used, which allow ammonia slip specifically. This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An exhaust gas after-treatment device, comprising:
    an exhaust line having an exhaust inlet for discharging an exhaust gas flow;
    a thermal reactor arranged in the exhaust line, the thermal reactor comprising:
        a first thermal reaction zone for a catalytic reaction in the exhaust gas flow;
        a second thermal reaction zone for a catalytic reaction in the exhaust gas flow; and
        a third reaction zone for a catalytic reaction in the exhaust gas flow, wherein the third reaction zone is between the first thermal reaction zone and the second thermal reaction zone;
    a mixing device arranged between the exhaust inlet and the thermal reactor, and connected to a control and/or regulation unit for admixing a reducing agent into the exhaust gas flow in the exhaust line; and
    at least one bypass line with a shutoff valve arranged therein, the at least one bypass line connected by a first end to the exhaust line downstream of a switching valve and by a second end to the thermal reactor between the first thermal reaction zone and the second thermal reaction zone.

2. The exhaust gas after-treatment device according to claim 1, wherein nitrogen oxides in the exhaust gas flow can be reduced by the catalytic reaction in the first thermal reaction zone and the second thermal reaction zone.

3. The exhaust gas after-treatment device according to claim 1, wherein the reducing agent includes urea and/or ammonia and/or a hydrocarbon.

4. The exhaust gas after-treatment device according to claim 1, wherein the first thermal reaction zone and the second thermal reaction zone comprise a surface structure with a coating.

5. The exhaust gas after-treatment device according to claim 1, wherein the thermal reactor has two openings and the openings are used alternately as an inlet opening or as an outlet opening for the exhaust gas flow depending on a switching status of the switching valve.

6. The exhaust gas after-treatment device according to claim 5, wherein the thermal reactor comprises a heater between the first thermal reaction zone and the second thermal reaction zone.

7. The exhaust gas after-treatment device according to claim 5, wherein the first thermal reaction zone comprises a first heat accumulator and the second thermal reaction zone comprises a second heat accumulator.

8. The exhaust gas after-treatment device according to claim 1, wherein the at least one bypass line is configured so that the first thermal reaction zone or the second thermal reaction zone can be bypassed by the exhaust gas flow.

9. The exhaust gas after-treatment device according to claim 1, wherein the shutoff valve is configured to shut off the at least one bypass line.

10. The exhaust gas after-treatment device according to claim 1, wherein the third reaction zone comprises a surface structure with a coating.

11. The exhaust gas after-treatment device according to claim 1, wherein the third reaction zone is heated.

12. The exhaust gas after-treatment device according to claim 11, wherein the third reaction zone is heated by an electrical heater.

13. The exhaust gas after-treatment device according to claim 1, further comprising a feeding device configured to introduce a fuel into the third reaction zone.

14. The exhaust gas after-treatment device according to claim 1, further comprising at least one temperature sensor arranged upstream and/or downstream of the third reaction zone.

15. The exhaust gas after-treatment device according to claim 1, wherein the control and/or regulation unit is configured to control and/or regulate at least one of: the mixing device, the switching valve, the shutoff valve, or a heating device.

16. The exhaust gas after-treatment device according to claim 15, wherein an at least one temperature sensor is connected with the control and/or regulation unit, and at least one of the following elements can be controlled and/or regulated based on an at least one measured temperature: the mixing device, the switching valve, the shutoff valve, or the heating device.

17. The exhaust gas after-treatment device according to claim 1, further comprising a fourth catalytic reaction zone between the first thermal reaction zone and the second thermal reaction zone.

18. A system comprising:
    a combustion engine;
    an exhaust gas after-treatment device coupled to the combustion engine, the exhaust gas after-treatment device comprising:
        an exhaust line having an exhaust inlet for discharging an exhaust gas flow;
        a thermal reactor arranged in the exhaust line, the thermal reactor comprising:
            a first thermal reaction zone for a catalytic reaction in the exhaust gas flow;
            a second thermal reaction zone for a catalytic reaction in the exhaust gas flow; and
            a third reaction zone for a catalytic reaction in the exhaust gas flow, wherein the third reaction zone is between the first thermal reaction zone and the second thermal reaction zone;
    a mixing device arranged between the exhaust inlet and the thermal reactor, and connected to a control and/or regulation unit for admixing a reducing agent into the exhaust gas flow in the exhaust line; and
    at least one bypass line with a shutoff valve arranged therein, the at least one bypass line connected by a first end to the exhaust line downstream of a switching valve and by a second end to the first thermal reaction zone of the thermal reactor.

* * * * *